United States Patent

[11] 3,614,550

[72] Inventors John C. Marinace;
Ralph C. McGibbon, both of Yorktown Heights, N.Y.

[21] Appl. No. 790,116
[22] Filed Jan. 9, 1969
[45] Patented Oct. 19, 1971
[73] Assignee International Business Machines Corporation
Armonk, N.Y.

[54] A SEMICONDUCTOR LASER DEVICE WITH IMPROVED OPERATING EFFICIENCY
3 Claims, 3 Drawing Figs.

[52] U.S. Cl. .......... 317/234 R, 317/235 N, 317/234 E, 317/235 M, 317/234 P, 332/7.51, 331/94.5, 317/234 N
[51] Int. Cl. .......... H01l 15/00
[50] Field of Search .......... 317/234 (4), 234 (3), 235 (26), 235 (27), 234 (6), 235, 234; 332/7.51; 331/94.5

[56] References Cited

UNITED STATES PATENTS

| | | | |
|---|---|---|---|
| 3,300,646 | 1/1967 | Casebeer | 250/228 |
| 3,305,745 | 2/1967 | Clock et al. | 313/108 |
| 2,946,935 | 7/1960 | Finn | 317/234 |
| 3,417,253 | 12/1968 | Kadah | 250/233 |
| 3,223,903 | 12/1965 | Solomon | 317/235 |
| 3,441,813 | 4/1969 | Takatsuka | 317/234 |
| 3,512,027 | 5/1970 | Kupsky | 313/108 |
| 3,482,189 | 12/1969 | Fenner | 332/7.51 |
| 3,483,397 | 12/1969 | Miller | 307/312 |
| 3,509,429 | 4/1970 | Craig et al. | 317/234 |
| 3,351,698 | 11/1967 | Marinace | 174/15 |

*Primary Examiner*—John W. Huckert
*Assistant Examiner*—Martin H. Edlow
*Attorneys*—Hanifin and Jancin and Hansel L. McGee

ABSTRACT: An improved electromagnetic wave-emitting device is provided. A high pressure is applied to the device by potting the device in a suitable encapsulant. The potted device exhibits a decreased threshold current density and an increase in its efficiency. Additionally, the device has a more durable structure and an increased shelf life.

INVENTORS
JOHN C. MARINACE
RALPH C. MC GIBBON
BY
Harold L. McGee
ATTORNEY

A SEMICONDUCTOR LASER DEVICE WITH IMPROVED OPERATING EFFICIENCY

BACKGROUND OF THE INVENTION

1. Field of the Invention

The present invention relates to an improved electromagnetic wave emitting device; more specifically, the invention relates to an electromagnetic wave-emitting device exhibiting increased output efficiency and to a method of preparing the improved device.

2. Description of the Prior Art

It is known in the prior art to prolong the shelf life of semiconductor devices, such as transistors, electroluminescent diodes and the like, by potting them in a resinous material. The prior art does not suggest, however, the use of such materials to pot semiconductor lasers, i.e., injection lasers. Nor is there a suggestion in the prior art that the potting of injection lasers in such materials would show a marked positive effect on the operating characteristics of the devices.

It has been desired in the past to pot or encapsulate injection lasers, principally, to strengthen the fragile structure of the laser and its mount. However, there are several factors which, until now, have prevented the potting of injection lasers. Normally it was thought that the threshold current density, a critical parameter, would be increased by surrounding the reflecting ends of the laser with a substance which had an index of refraction greater than unity. Another parameter, efficiency of the laser, was thought to be impaired because of the absorption of radiation by the potting material. Additionally, because of the fragile structure of the laser it was thought that on contracting, the potting materials would exert such high pressures on the laser, that the laser would be crushed. F. M. Ryan and R. C. Miller, in the publication entitled, "The Effect of Uniaxial Strain on The Threshold Current and Output of GaAs Lasers," Applied Physics Letters 3, 9, 162 (1963) have demonstrated that pressures upward to 6,500 atmospheres could be applied to an injection laser without fracturing the same. They have also demonstrated that under increased pressures, the threshold current density decreased and the output efficiency of the device increased. The publication does not, however, teach or suggest that the increase in pressure could be maintained in an operable manner, i.e., by potting the device in a suitable potting material or encapsulant.

SUMMARY OF THE INVENTION

In accordance with this invention there is provided an improved electromagnetic wave-emitting device which has improved operating characteristics. In a preferred embodiment, a GaAs laser is potted in a suitable potting material. The potted material on cooling, provides a high pressure about the device and its mount. Due to this pressure, the potted device, beside having a more rugged and durable structure and an increased shelf life, also has improved operating characteristics, such as its threshold current density which is decreased and an increased efficiency. The efficiency of the device has been increased as much as 100 percent or more.

OBJECTS OF THE INVENTION

An object of the invention is to provide an improved electromagnetic wave-emitting device.

Another object of the invention is to provide a potted electromagnetic wave-emitting device having a decreased threshold current density and increased efficiency.

And yet another object of the invention is to provide a potted electromagnetic wave-emitting device having a durable structure with increased shelf life.

The foregoing and other objects, features and advantages of the invention will be apparent from the following more particular description of preferred embodiments of the invention, as illustrated in the accompanying drawings.

DESCRIPTION OF PREFERRED EMBODIMENTS

It should be understood at the outset that the terms potting and encapsulating are herein used synonymously. The terms potting material and encapsulant are likewise interpreted as having the same meaning.

Figure 1:
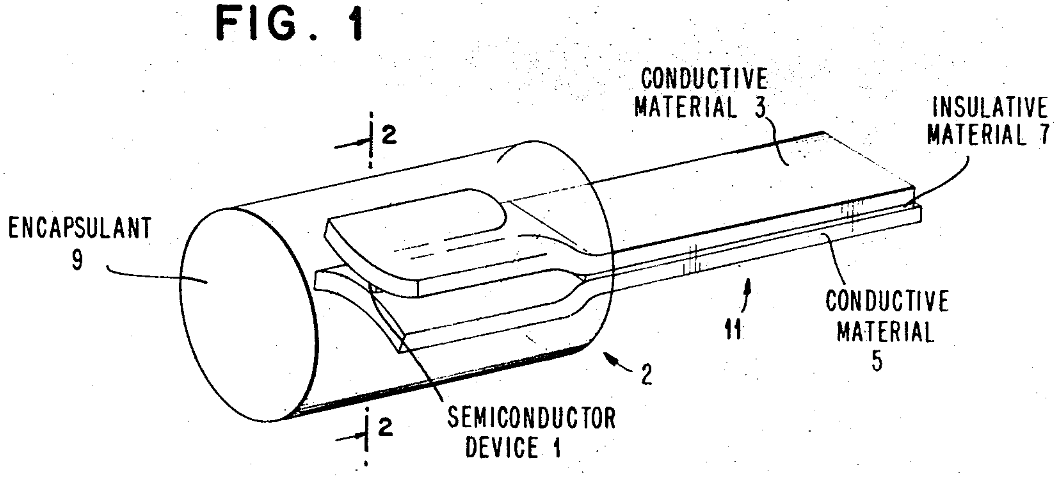
FIG. 1 is a pictorial representation of a typical potted semiconductor laser and its mounting.
Figure 2:
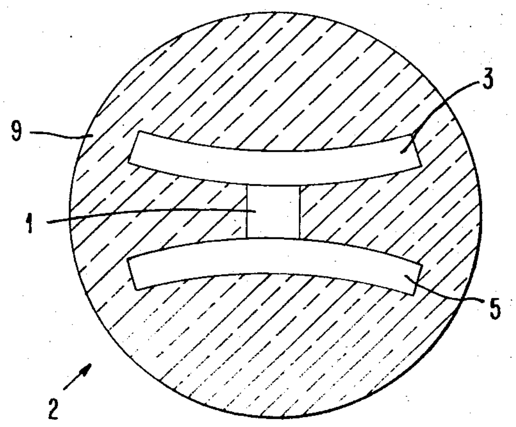
FIG. 2 is a cross-sectional view of FIG. 1 taken along the line 2—2.
Figure 3:
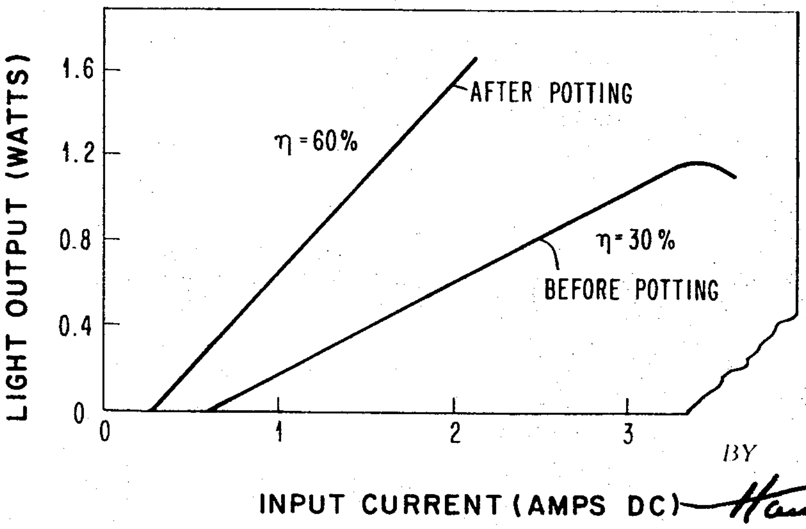
FIG. 3 is a graph depicting and comparing the input current vs light output of a potted GaAs laser and the same laser before potting.

Referring in detail to FIGS. 1 and 2, a semiconductor device 1 is shown in its heat sink mounting. The device 1 is mounted in its heat sink mounting shown generally as 11, according to a modified version of the invention disclosed in U.S. Pat. No. 3,351,698, entitled Heat Sink Mounting for Semiconductor Devices, filed on Nov. 13, 1964 in the name of John C. Marinace and assigned to a common assignee. The device 1 is positioned centrally between first and second planar members 3 and 5, which are rigidly bonded at one end on insulating spacer 7. Spacer 7 is the same thickness as is device 1, thus eliminating the need of the transverse bend in the upper planar member 3 as shown in FIGS. 1–3 of the above-cited U.S. Pat. No. 3,351,698. Also, the device ends of the planar members 3 and 5 are bent in a flare shape so that the device 1 can be positioned on the longitudinal axis of the mount 11. The longitudinal axis of the device 1 is still perpendicular to the longitudinal axis of the mount, although it sometimes is mounted parallel.

The planar members 3 and 5 are formed of resilient conductive material exhibiting good thermal conduction properties and, in addition, coefficients of linear expansion compatible with that of the semiconductor material forming device 1, herein illustrated, as a GaAs diode laser. Suitable material for forming members 3 and 5 include molybdenum (Mo), copper (Cu), silver (Ag), tungsten (W) etc. For example, when members 3 and 5 are fashioned of ordinary annealed stock it need not be of exceptionally high purity. However, for optimum performance, the highest electrical and thermal conduction are preferable. Members 3 and 5 are critically spaced to allow insertion of diode laser 1 and provide firm pressure contacts thereon.

Spacer 7 is formed of appropriate insulating material, e.g., semi-insulating GaAs, "Pyrex," glass, ceramic beryllium oxide (BeO), ceramic aluminum oxide ($Al_2O_3$) or other insulating material having good mechanical properties. For example, fiberglass-reinforced epoxy is often used. The thickness of spacer 7, as indicated above, is the same thickness as device 1. It is also desirable that the thermal contraction of spacer 7 is greater than that of device 1 so that, when immersed in a liquid coolant bath, e.g., liquid nitrogen (77° K.), not shown, device 1 is subjected to increased compressive stress which is desirable. However, this increased compressive stress is not sufficient to appreciably lower the threshold hold current density of the device or to increase its output efficiency.

When the device 1 and its heat sink mounting generally shown as 11, is prepared according to the method of aforementioned U.S. Pat. No. 3,351,698, said method being incorporated herein, it is placed in a mold containing a potting material to form the encapsulant 9. The potting material or encapsulant is a material selected from epoxy resins, polyester resins, silicone rubbers, styrene polymers, polyurethanes, inorganic polymers, glasses and the like. The potting material must be transparent to light so as not to appreciably absorb the emitted light from diode laser 1. The curing temperature of the material used should preferably be less than 125° C. Further, the material should have a temperature coefficient of expansion such, that on cooling, the volume decrease of the material will exert a uniaxial or hydrostatic compression on the device 1 and its mounting 11 of the order of about 2,500 atmospheres to about 8,400 atmospheres. Similarly, it is desirable to use a potting material which upon curing decreases in volume to effect the same compression as on cooling. In a preferred embodiment of the invention, DER 332, a diglycidyl ether of bisphenol A, prepared by The Dow Chemical Company is used. Triethylene tetramine is added as a curing agent. The resin has an epoxy equivalent weight of about 172 to 176. Cured DER 332 is found to have a temperature coefficient of expansion of about $40\times10^{16/\circ}$ C. to about $50\times10^{16/\circ}$ C. between room temperature and 77° K. This material also has an index of refraction value of about 1.53 measured at a wavelength of 9,000° A. The volume contraction of the epoxy resin applies a pressure to diode laser 1 which results in the improved thermal contact between the diode laser 1 and the members 3 and 5, as well as enhancing injection characteristics at the PN junction of the diode laser 1.

In a preferred embodiment a GaAs diode laser 1 fitted in its heat sink mounting 11 is inserted in a cylindrical silicone treated mold containing DER 332 epoxy resin. The resin is allowed to cure at room temperature from about 8 hours to about 16 hours after which it is cured in an oven at a temperature of about 75° C. for about 2 hours. The potted assembly shown generally as 2 in FIGS. 1 and 2 is removed from its mold and is cooled to 77° K. and the diode laser is operated thereat. As seen in FIG. 3, a plot of input current, i.e., threshold current density, versus light output in watts, the potted diode laser 2 has an efficiency (*n*) of 60 percent. It is further seen in FIG. 3 that for a given input current the potted device 2 gives appreciably greater light output than does the same device before potting. As shown, the unpotted laser had an efficiency of about 30 percent. Both the potted and unpotted diode had the [100] orientation. Diodes having the [111] and [110] orientation were similarly used and gave similar results.

In a similar manner as above, other diode lasers were potted in other resinous materials to give comparable results as that shown in FIG. 3. For example, diodes were potted in Vorite 128, i.e., a polyisocyanate prepared by The Baker Castor Oil Company. The polyisocyanate has an isocyanate content of 10.6 percent and an equivalent weight per isocyanate group of 396. One hundred parts by weight of polyisocyanate is mixed with 42.7 parts by weight of polycin 12, a polyol hardener also prepared by The Baker Castor Oil Company. Polycin 12 has an isocyanate equivalent weight of 169, a functionality of about 4.2, a Hydroxyl value of 327 and an acid number of 3.0. The mixture is degassed and poured into a silicone treated mold, in which is suspended the diode laser 1 and its mounting 11. The potting mixture is cured at 100° C. for 4 hours. The potted mixture is found to have an index of refraction value about the same as that given above for DER 332.

It should become immediately apparent to those skilled in the art that other potting configurations can be prepared. For example, spherical and parabolic configurations are also prepared by using appropriate molds.

While the invention has been particularly shown and described with reference to preferred embodiments thereof, it will be understood by those skilled in the art that various changes in form and details may be made therein without departing from the spirit and scope of the invention.

What is claimed is:

1. In an article which includes a semiconductor laser device and a heat sink mounting therefore, wherein said mounting comprises a pair of planar members formed of resilient, electrically and thermally conductive materials and rigidly supported at one end portion on an insulating spacer in parallel electrically insulated relationship, the other end portions of said said members being bent in a flare shape, said device being inserted between said other end portions along the longitudinal axis of said mounting, said spacer having a thickness substantially equal to the thickness of said device, the improvement which comprises:

an encapsulant encapsulating said other end portions, said encapsulant being an epoxy resin having a temperature coefficient of expansion of about $40\times10^{16\circ}$/C. to about $50\times10^{16\circ}$/C. between room temperature and 77° K., cooling said article from said room temperature to said 77° K. temperature causing the volume of said encapsulant to decrease to exert a uniaxial or hydrostatic compression on said semiconductor laser device of about 2,500 to about 8,400 atmospheres.

2. An article as defined in claim 1 wherein said epoxy resin is a diglycidyl ether of bisphenol A, to which triethylene tetramine is added as a curing agent and which has an epoxy equivalent weight of about 172 to 176.

3. An article as defined in claim 1 wherein said encapsulant has an index of refraction value of about 1.53 measured at a wavelength of 9,000A.

PO-1050
(5/69)

UNITED STATES PATENT OFFICE
CERTIFICATE OF CORRECTION

Patent No. 3,614,550 (790,116) Dated October 19, 1971

Inventor(s) JOHN C. MARINACE ET AL

It is certified that error appears in the above-identified patent and that said Letters Patent are hereby corrected as shown below:

Column 3, line 11: "$40x10^{16°}$/C" should read --$40x10^{-6°}$/C.--

Column 3, line 12: "$50x10^{16°}$/C" should read --$50x10^{-6°}$/C.--

Column 4, line 32: "$40x10^{16°}$/C" should read --$40x10^{-6°}$/C.--

Column 4, line 33: "$50x10^{16°}$/C" should read --$50x10^{-6°}$/C.--

Signed and sealed this 30th day of May 1972.

(SEAL)
Attest:

EDWARD M.FLETCHER,JR.
Attesting Officer

ROBERT GOTTSCHALK
Commissioner of Patents